United States Patent
Best (10) Patent No.: US 10,089,217 B2
(45) Date of Patent: Oct. 2, 2018

(54) IDENTIFICATION OF SOFTWARE TEST CASES

(71) Applicant: Red Hat, Inc., Raleigh, NC (US)

(72) Inventor: Steven Francis Best, Groton, MA (US)

(73) Assignee: Red Hat, Inc., Raleigh, NC (US)

( * ) Notice: Subject to any disclaimer, the term of this patent is extended or adjusted under 35 U.S.C. 154(b) by 65 days.

(21) Appl. No.: 14/494,024

(22) Filed: Sep. 23, 2014

(65) Prior Publication Data

US 2016/0085663 A1    Mar. 24, 2016

(51) Int. Cl.
*G06F 11/00*     (2006.01)
*G06F 11/36*     (2006.01)

(52) U.S. Cl.
CPC ...... *G06F 11/3684* (2013.01); *G06F 11/3692* (2013.01)

(58) Field of Classification Search
CPC ............. G06F 11/3684; G06F 11/3692
USPC ............................................. 714/38.1
See application file for complete search history.

(56) References Cited

U.S. PATENT DOCUMENTS

| | | | |
|---|---|---|---|
| 6,449,741 B1 * | 9/2002 | Organ ................. | G01R 1/025 714/46 |
| 6,934,656 B2 | 8/2005 | Norman et al. | |
| 7,092,837 B1 * | 8/2006 | Lanier .............. | G01R 31/31903 702/110 |
| 7,490,319 B2 | 2/2009 | Blackwell et al. | |
| 7,644,398 B2 * | 1/2010 | Cleaveland ......... | G06F 11/3684 703/14 |
| 8,561,036 B1 * | 10/2013 | Beans ................. | G06F 11/368 717/124 |
| 8,732,666 B2 | 5/2014 | Lau et al. | |
| 9,317,401 B2 * | 4/2016 | Bartley .............. | G06F 11/3676 |
| 9,519,463 B1 * | 12/2016 | Leippe ................ | G06F 8/34 |
| 9,606,178 B2 * | 3/2017 | Schiessl ............. | G01R 31/3183 |
| 9,665,233 B2 * | 5/2017 | Rosen ................ | G06F 3/0481 |
| 9,703,694 B2 * | 7/2017 | Li ..................... | G06F 11/3692 |
| 2005/0044533 A1 | 2/2005 | Nesbit et al. | |
| 2005/0166094 A1 * | 7/2005 | Blackwell ........... | G06F 11/3664 714/38.14 |
| 2005/0223357 A1 * | 10/2005 | Banerjee ............. | G06F 11/3676 717/120 |
| 2007/0260929 A1 * | 11/2007 | Liu ..................... | G06F 11/3644 714/38.14 |

(Continued)

FOREIGN PATENT DOCUMENTS

EP    2333669 B1    9/2012

OTHER PUBLICATIONS

"Code Coverage Tools" 4 pages, Wiki Category Software Tool, downloaded from "http://c2.com/cgi/wiki?CodeCoverageTools" as last edited May 27, 2014.

(Continued)

*Primary Examiner* — Yair Leibovich
(74) *Attorney, Agent, or Firm* — Lowenstein Sandler LLP (57) ABSTRACT

A method for identifying test case for software testing is disclosed. The method, receives a test case of a plurality of test associated with a software application. The test case includes a test input for processing by the software application. The test input designed for verifying compliance with a specific requirement. The method further generates mapping data for the test case. Mapping data associates one or more parts of a source code of the software application to the test case.

20 Claims, 5 Drawing Sheets

(56) References Cited

U.S. PATENT DOCUMENTS

| | | | | |
|---|---|---|---|---|
| 2008/0172655 A1* | 7/2008 | Davia | ................. | G06F 8/77 |
| | | | | 717/130 |
| 2011/0107307 A1* | 5/2011 | Liu | ................. | G06F 11/3664 |
| | | | | 717/125 |
| 2013/0298110 A1* | 11/2013 | Boden | ................. | G06F 11/3676 |
| | | | | 717/125 |
| 2015/0370689 A1* | 12/2015 | Prasad | ................. | G06F 11/366 |
| | | | | 717/124 |

OTHER PUBLICATIONS

"Code Coverage" Wikipedia article, 5 pages, downloaded from "http://en.wikipedia.org/w/index.php?title=Code_coverage&oldid=622313779" as last modified on Aug. 22, 2014.

Beacon IP Search Report for 20141097US—Know the Test Cases that Cover Each Subroutine of the Source Code dated Jul. 30, 2014, 7 pages.

Zheng et al., "A Lightweight Process for Change Identification and Regression Test Selection in Using COTS Components" Department of Computer Science, NCSU, ABB Inc., US Corporate Research, 10 pages.

Eder et al., "Did We Test Our Changes? Assessing Alignment between Tests and Development in Practice" IEEE, AST 2013 San Franciso, CA. 4 pages.

Beszedes et al., "Code Coverage-BAsed Regression Test Selection and Prioritization in WebKit" University of Szeged, Department of Software Engineering & HAS Research Group on AI, Szeges, Hungary. IEEE 2012. 10 pages.

Sachdeva, Nikhil, "Automated Unit Tests for Legacy Code with Pex" MSDN Magazine Dec. 2009 Issue accessed from http://msdn.microsoft.com/en-us/magazine/ee819140.aspx. 19 pages.

* cited by examiner

IDENTIFICATION OF SOFTWARE TEST CASES

TECHNICAL FIELD

This disclosure is related generally to software testing, and more particularly, to identifying test cases for software testing.

BACKGROUND

Software testing is a process performed to provide stakeholders with information about the quality of the software product or service under test. Test techniques include, but are not limited to, the process of executing a program, project, or application in a controlled environment with a set of test inputs or execution conditions that when executed by the program, project, or application generate test results used to verify compliance with a specific requirement. Such testing may be implemented by test cases, often called test scripts, and is conducted with the intent of finding errors, flaws, and mistakes in the software.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

A method and apparatus for an automated identification of test cases for a software project is described. Traditionally, as software projects grow in size and complexity, more powerful and comprehensive testing techniques become necessary. For example, the current Linux kernel consists of over 17 million lines of code. A software developer must, in some sense, pick and choose individual test cases or test suites (a collection of test cases) from memory that cover the code to be tested. Software developers may know a few key test cases to run, but as software projects increase in size and scope, a developer's knowledge of applicable test cases quickly becomes inadequate and as a result both the quality of testing and the quality of the software suffer.

In one example, a computer system implementing the method may present, via a user interface a software developer with all the test cases that cover the code the developer is changing or creating. The computer system, via a user interface, may receive from the developer a file name identifying for example, a line of code or routine. A developer may identify the specific line of code or routine, by providing an indicator, such as highlighting the specific code in the user interface. The computer system may return, via a user interface, all the available test cases that cover the specified line of code or routine. A developer may no longer need to guess which test cases actually cover the submitted code. As a result, the amount of regression testing may be reduced and the quality of the code improved.

Figure 1:
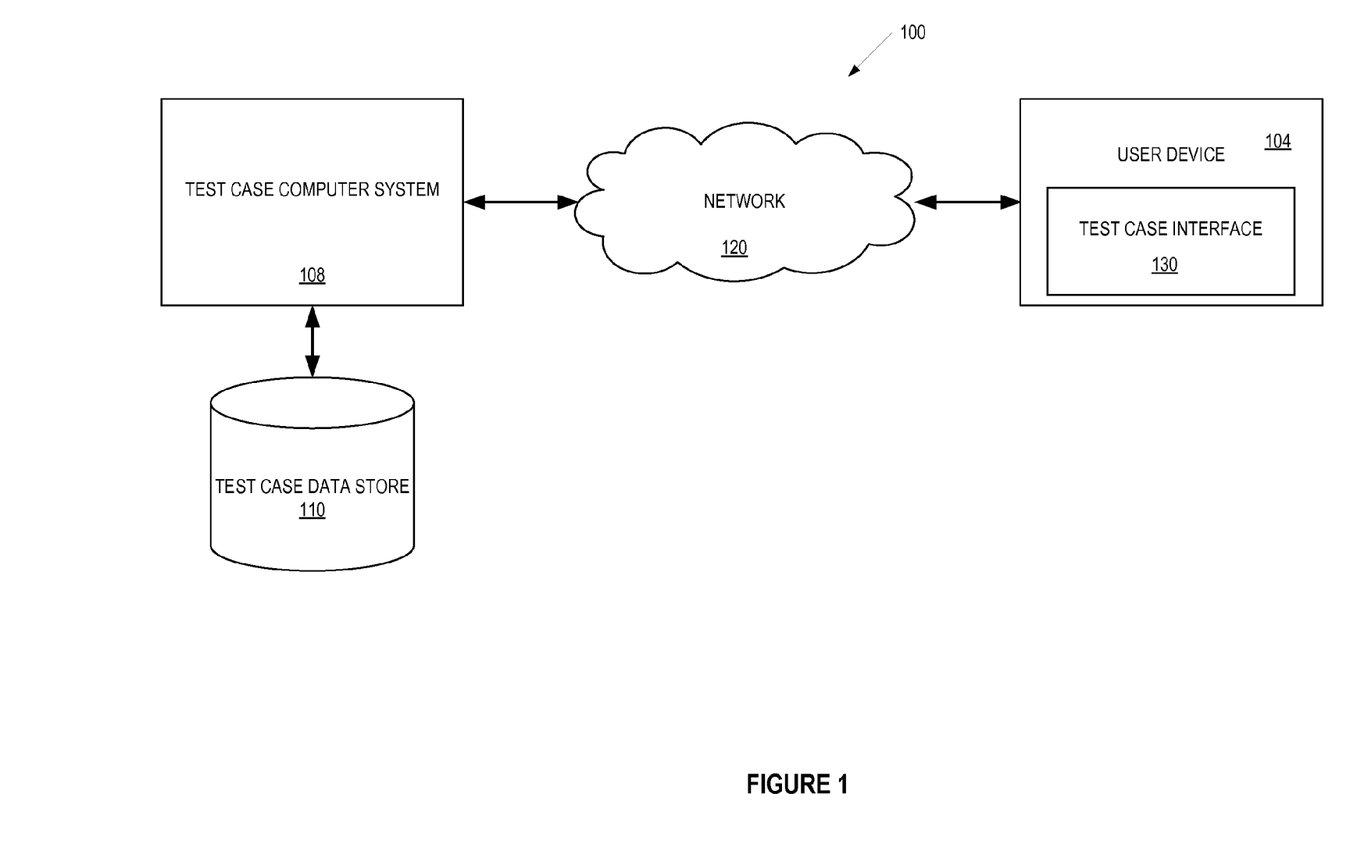
FIG. 1 is a block diagram of an example system architecture for implementing a test case interface.

FIG. 1 is a block diagram of an example system architecture for implementing a test case interface. In one example, the system 100 includes a user device 104 and a test case computer system 108. In one example, user device 104 may be a computing device, such as a personal computer, personal digital assistant, laptop computer, tablet computer, etc. The test case computer system 108 may also be a computing device, such as a server computer, desktop computer, etc.

The user device 104 and the test case computer system 108 may be coupled to a network 120. The user device 104 and the test case computer system 108 may reside on a Local Area Network (LAN) and may be incorporated into the same physical or logical system, or different physical or logical systems. Alternatively, the user device 104 and the test case computer system 108 may reside on different LANs that may be coupled together via the Internet but separated by firewalls, routers, and/or other network devices. In yet another configuration, the user device 104 and the test case computer system 108 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The test case computer system 108 may be employed for providing a set of utilities for testing software applications. A software application may include one or more executable modules that are derived from source code. In one example, one of the utilities provided by test case computer system 108 is a library of test cases and test suites stored in test case data store 110. The test cases include a test input for processing by the software application. The test input is designed for verifying compliance with a specific requirement. Test cases may comprise software scripts designed to control the operation of a software application or project. It should be noted that software application and software project may be used interchangeably. Test cases may be used by a developer to determine if an application, software system or one of its features is working properly. For example, the test cases may include test inputs or execution conditions that can be executed by the test case computer system 108 for opening applications, loading data, simulating user interactions, etc. A test input may be a known input to a software application that when executed by the software application produces an expected output. Execution conditions specify the conditions under which the software application is to be executed. A test input may include variables or conditions, such as execution conditions. In one example, test cases may be grouped together in collection called a test suite. A test suite often contains detailed instructions or goals for each collection of test cases and information on the system configuration to be used during testing. The test case computer system 108 may provide other testing utilities such as, performance measurement utilities, program execution logs, generation of graphical user interface reports for software tests, etc.

The test case computer system 108 may also provide code coverage for each test case in the test case data store 110. Code coverage is a metric that may be used to describe the degree to which the source code of a software application is tested by a particular test case or test suite. A program with high code coverage has been more thoroughly tested and has a lower chance of containing software bugs than a software application with low code coverage. When a test case is run using code coverage techniques every routine that is executed in the software application is mapped back to the routine points or specific lines in the source code. Code coverage techniques allow developers to look for parts of a software application that are rarely or never accessed under normal operating conditions and helps reassure developers and test engineers that important conditions or functions have been tested. The results of testing the code coverage may be analyzed to understand what areas of code have not been exercised and test cases may be updated or new test cases implemented to include these areas as necessary.

Types of code coverage include line coverage, function coverage, statement coverage, branch coverage, condition coverage, multiple condition coverage, or parameter value coverage. Line coverage is a metric including an attribute that indicates whether a line of the source code of the software application is executed by a test case. Branch coverage is a metric including an attribute that indicates whether branches or code decision points of the source code of the software project that are executed in a test case. Statement coverage is a metric including an attribute that indicates statements of the source code of the software project that were that are executed in the completed test case. Condition coverage is a metric comprising an attribute that indicates if each Boolean sub-expression (i.e., condition) of the source code of the software project has been evaluated as true and false. Multiple condition coverage is a metric including an attribute that indicates if all combinations of conditions inside each decision of the source code of a software project are tested by the test case. Parameter value is a metric including an attribute that indicates that in a method taking parameters of the source code of the software project, all common values for such parameters have been considered for an executed test case. For each type of code coverage, a coverage metric may be determined, e.g., measured as a ratio of units of source code tested by the test case to total units of source code of the software application. [Steve, is the correct definition of coverage metric? sfb yes this is correct.]

For example, consider the following function, "foo," located in the file arch/x86/kernel/time.c:

```
int foo (int x, int y)
{
int z=0;
if ((x>0) && (y>0))
{
z=x;
}
return z;
}
```

In this example, function "foo" is part of a larger software application and a test case or test suite was run for the software application. During the execution of the test case, if "foo" was called in at least once, function coverage is satisfied. Statement coverage for "foo" may be satisfied if foo (1,1) and every line of the function is executed included z=x. Branch coverage may be satisfied by calling foo(1,1) and foo(0,1). In the first case, (i.e., foo (1,1)), the two "if" conditions are met and z=x is executed, while in the second case, (i.e., foo (0,1)), the first condition (x>0) is not satisfied, which prevents z=x from executing. Condition coverage may be satisfied with test cases that call foo(1,1), foo(1,0), and foo(0,0). All are required to meet condition coverage because in the first two cases, (x>0) evaluates to true, while in the third, (x>0) evaluates to false. At the same time, the first case evaluates (y>0) true, while the second and third evaluates (y>0) false.

In one example, test case interface 130 employs information obtained when executing code coverage techniques. When test case computer system 108 executes code coverage techniques as described above, test case computer system 108 includes an indication of what units of source code of a software application are executed during the execution of a test case. For example, when testing for line coverage, test case computer system 108 generates an indication of the specific individual lines of source code are tested. Test case interface 130 uses the information by taking the indication of specific units of source code tested by generating mapping data. Generating mapping data includes associating the units of source code tested by a particular test case with the test case. Test case interface 130 maps the units of source code to the test case that executes the units of source code. A unit of source code may be any portion of source code of a software project and includes lines of code and routines. Test case interface 130 may cause the mapping data to be stored in test case data store 110 In one example, the mapping data includes information that identifies the routines and individual lines of source code that each test case covers. For example, mapping data for test case A may include data that identifies lines 1-10 and the routine, foo, as being tested by test case A. In another example, test case interface 130 may cause test case computer system 108 to store the mapping data for each type of code coverage. For example, the mapping data for line coverage may map the lines of source code tested by test case to that specific test case or test suite. In another example, the mapping data for function coverage may identify the functions in the source code that are covered by a particular test case or test suite. Note that a routine may also be called a subroutine, a procedure, a function, a method, a callable unit, or subprogram, all of which may be considered an example of a unit of source code. Unit of source code and part of source code may be used interchangeably.

In one example, the test case interface 130 allows a user using user device 104 to interact with the test case computer system 108 and test case data store 110. The test case interface 130 allows a user to determine, select, and execute test cases for a unit of source code of a software application. The test case interface 130 allows a user to identify one or more units of source code, for example by a file name, and receive test cases from test case data store 110 that cover the identified unit of source code. Test case interface 130 may cause test case computer system 108 to search the mapping data to identify test cases that cover the unit of source code identified by the developer. The test case interface 130 may present the test cases that cover the unit of source code identified by the developer on user device 104. The developer may select one or more of the presented test cases to be executed on test case computer system 108. Test case computer system 108 may execute the selected test cases and deliver the results to test case interface 130. Test case interface 130 may cause the test results to be displayed on user device 104 on a graphical user interface (GUI). The test case interface may be further described in the FIGS. 2-5.

Figure 2:
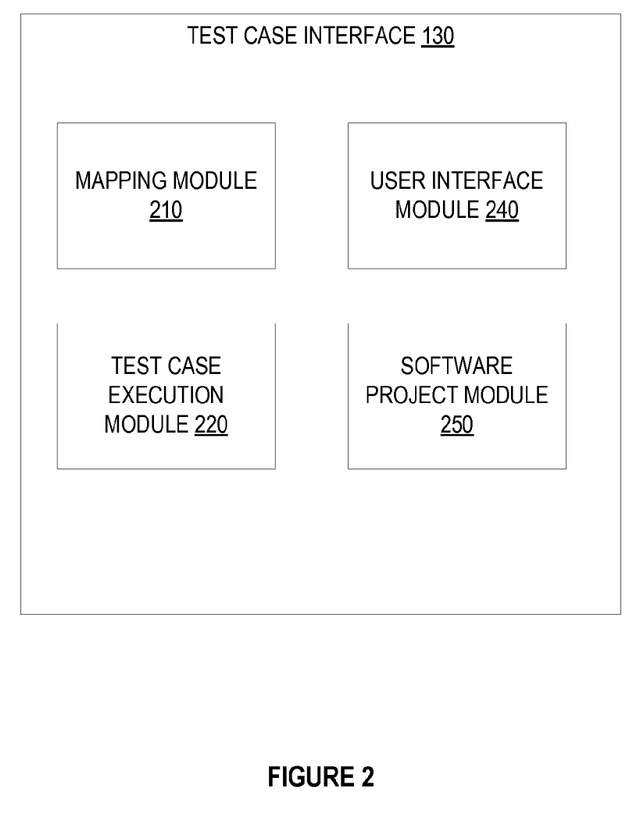
FIG. 2 is a block diagram illustrating an example test case interface.

FIG. 2 is a block diagram illustrating an example test case interface. Test case interface 130 includes mapping module 210, test case execution module 220, user interface module 240, and software project module 250. Test case interface 130 may be implemented on a user device 130, as illustrated in FIG. 1. Test case interface may also be implemented on test case computer system 108. Parts of test case interface 130 may be implemented on user device 104, while other parts of test case interface 130 may be implemented on test case computer system 108. For example, mapping module 210, test execution module 220, and software project module 250 may be implemented on the test case computer system 108, and user interface module may be implemented on user device 130.

Test case interface 130 allows a user of user device 104 to enter a unit of source code of a software project and receive the test cases that cover the unit of source code. The various modules contained in test case interface 130 help to implement the various features of test case interface 130. For example, test case A covers architecture X, routine Y, and lines 1-10 of source code of software project Z. Mapping module 210 may use the aforementioned mapping data and associate test case A with architecture X, routine Y, and lines 1-10 of software project Z in, for example, test case data store 110 of FIG. 1. When a developer changes a line of code in, for example, architecture X, routine Y, and line 2 in the source code of software project Z, the developer may request test case interface 130 to retrieve all the test cases that cover line 2 of the source code. Test case interface may recover test case A, and present the test case to the user in graphical user interface (GUI) in the user device 104.

In one example, mapping module 210 employs code coverage techniques, as described above in FIG. 1, to obtain and store mapping data that associates each test case to the various units of source code that each test case covers or tests. Code coverage techniques generate metrics including an attribute that indicates what unit of source code of a software projects is tested by a test case. Code coverage includes attributes that indicate which assembly, class, method or line of code a test case covers. Code coverage techniques include statement coverage, condition coverage, decision coverage, multiple condition coverage, function coverage, branch coverage, parameter value coverage, and path coverage.

In one example, mapping module 210 may use the code coverage data when a test case is executed for a software project. Mapping module 210 generates mapping data for a test case. The mapping data associates the units (e.g., parts) of the source code tested by a test case to the test case. Mapping data may include associating lines of code, routines, libraries, and architectures tested by a test code to the test code. Mapping data may also include code coverage metrics. For example, statement coverage is a metric indicating an attribute that indicates whether an executable statement is covered by a test case. Mapping module 210 may generate mapping data that associates each statement covered by a particular test to the test case. In another example, decision coverage is a metric including an attribute that indicates whether a Boolean expression is tested in control structures (such as the if-statement and while-statement evaluated as both true and false). The entire Boolean expression is considered one true-or-false predicate. Mapping module 210 may generate mapping data that associates the Boolean expressions tested by a test case with the test case. For each of the code coverage metrics or code coverage techniques, Mapping module 210 may generate mapping data.

In another example, the mapping module 210 may update the mapping data. Mapping module 210 may update the mapping data when a unit of source code in the software project is modified. Mapping module 210 may update the mapping data when a test case is modified or when a new test case is added to the test case data store 110. Mapping module 210 may be invoked to update the mapping data when any one of the user interface module 240, test case execution module 220, or software project module 250 detects any. Mapping module 210 may update the mapping data at regular intervals. For example, mapping module 210 may update the mapping once a day or once a week, or any period that an administrator or user determines is desirable.

In one example, test case interface 130 includes test case execution module 220. Test case execution module 220 executes a test case or test suite for a specified software project. Test case execution module 220 may initiate the execution of a test case in response to a request from mapping module 210. As described above, mapping module 210 may request the execution of a test case at regular intervals, such as when a test case is updated, when a new test case is added, or when the source code is changed. Test case execution module 220 may also execute a test case at the request of the user. A user may request that one or more test cases be executed. For example, if a user is looking to find the test cases that cover a particular part of the source code, and is given the test cases that cover the source code, the user may select one or more test cases to be executed. Test case execution module 220 may execute the selected test case and generate results. Test case execution module 220 may execute the test cases on the test case computer system 108 or on the user device 104. It should be noted that that the processing of test cases may be computationally intensive and require multiple computer systems.

In another example, mapping module 210 may leverage the data used and generated by the execution of test cases by test case execution module 220 to generate mapping data. As discussed above, test cases cover certain lines of code, routines, etc. When executing a test case, mapping module 210 may determine what lines of codes and routines are covered by a particular test case, and generate the appropriate mapping data. In another example, mapping module 210 may generate mapping data that corresponds to the different code coverage metrics when a particular test case is executed by test case execution module 220.

In one example, test case interface 130 includes user interface module 240. The user interface module 240 provides for a user interface to be displayed on a user device 104. The display may be in the form of GUI or any other type of display module. The user interface module 240 may also be a software application that enables a user to use the features disclosed in the present application. The user interface module 240 may receive input form a user, such as a test case request, and interact with the other modules of test case interface 130 to generate a response. For example, user interface module 240 may generate a GUI to be displayed on user device 104 that allows the user to search for the test cases that cover a part of the source code for a software project. A user may select lines 1-20 of project A and enter a test case request in the GUI. User interface module 240 may receive the request, and communicate with mapping module 210 to determine if any test cases stored in test case data store 110 cover the requested code. If there are test cases that cover the requested code, user interface module 240 may return to the user a selection of test cases that cover the part of the code. The user interface module 240 may indicate if the returned test cases cover all or part of the request source code. Additionally, the user interface module 240 may also indicate to the user the code coverage metrics for each test case returned to the user. For example, user interface module 240 may cause to be displayed on the user device 104 the type of code coverage each of the test cases includes. Additionally, if there are no test cases that cover the source code request by the user, user interface module 240 may inform the user that no test cases cover the submitted source code. All the above information may be displayed in a GUI at the user device 104.

In another example, user interface module 240 receives test cases selected by the user. The user interface module 240 may induce the test cases to be executed by the appropriate hardware. For example, after the user interface module 240 returns to the user test cases that cover the code, the user may select one or more of the test cases to be executed. User interface module 240 receives the request from the user device 104 and communicates with test case execution module 220 to execute the identified test cases and return the results. User interface module 240 may retrieve the test case results from test case execution module 220 and present the results to the user in a GUI on user device 104.

In another example, user interface module 240 may receive new test cases from the user. User interface module 240 may cause mapping module 210 to generate new mapping data for the new test case and cause mapping module 210 to store the new mapping data in test case data store 110. In addition, user interface module 240 may cause the new test case to be stored in test case data store 110.

In one example, test case interface 130 includes software project module 250. Software project module 250 may store the source code of one or more software projects in an associated data store, such as test case data store 110. Test case execution module 220 may call on the software project module 250 to retrieve the appropriate software project for which a test case may be executed. Software project module 250 may keep track of the various software projects that are stored on system 100 of FIG. 1. Software project module 250 may keep track of which test cases are associated with a particular software project. When a software project is modified, software project module 250 may notify mapping module 210, so that mapping module may update the mapping data for the software project.

Figure 3:
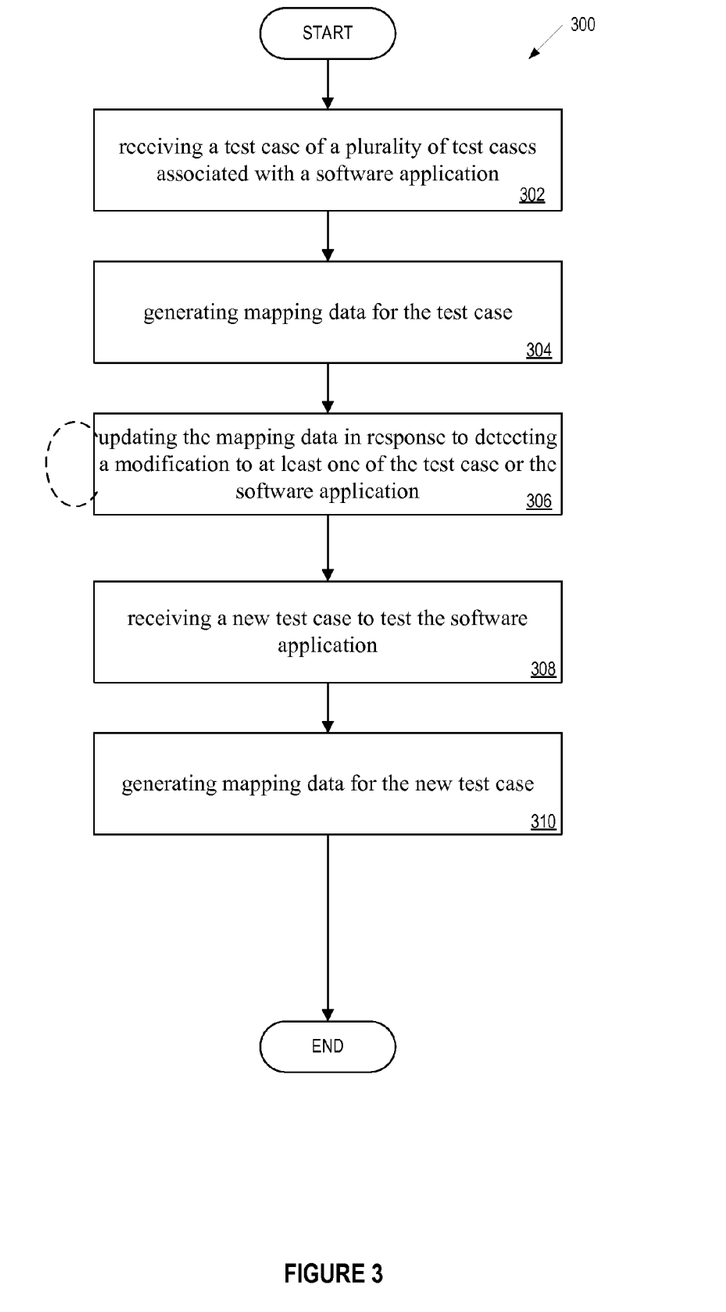
FIG. 3 is a flow diagram illustrating an example method for generating mapping data for a test case interface, according to an implementation of the disclosure.

FIG. 3 is a flow diagram illustrating an example method for generating mapping data for a test case interface, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by system 100 of FIG. 1. In another implementation, method 300 is performed by test case interface 130 of FIG. 2.

Method 300 begins at block 302 where the processing logic implementing the method receives a test case of a plurality of test cases associated with a software application. In one example, a test case may comprise requirement test input for processing by the software application. The test input is designed for verifying compliance with a specific requirement. Test cases may contain a single step or a sequence of steps to test the functionality and features of a software project. An expected result or outcome may be given. Results of an executed test case may be compared with the expected results in order to verify the functionality of the part of the software being tested. The execution of the test case may be automatically initiated by test case interface 130, at for example, regular intervals. The execution of a test case may be in response to a user request received from user device 104. Alternatively, the execution of a test case may be triggered by an event. The execution of the test case may generate mapping data. For example, modifying a software project, modifying a test case, or supplying a test case may be events that cause processing logic to initiate the execution of a test case.

Method 300 continues at block 304 where the processing logic generates mapping data for the test case. The mapping data associates one or more parts of the source code tested by the test case to the test case. As discussed with references to FIG. 1 and FIG. 2, a test case tests parts of source code of a software project. When executing a test case, as described in block 302 above, the processing logic may determine what parts of the source code a test case covers. The processing logic may generate mapping data that maps a test case to the parts of the code that the test case covers. The mapping data may be stored in a data store, such as test case data store 110 of FIG. 1. In addition, processing logic may use code coverage techniques to generate additional mapping data. As described above with references to FIG. 1 and FIG. 2, code coverage allows a developer to determine what portion of the source code of a software project is covered by a test case. For example, function coverage may determine that 65% of a particular function is covered by test case A. The processing logic may use the code coverage techniques, by generating mapping data that associates the tested function with, for example, test case A. Processing logic may also store as mapping data the percentage of code coverage, for example, that test case A covers. The mapping data may include associating individual lines of source code to a test case. Mapping data may include associating a routine of the source code with a test case.

Method 300 continues to block 306, where the processing logic updates the mapping data. Processing logic may update the mapping data in response to detecting a modification to at least one of the test case or the software application. For example, if the source code of a software application is modified, the prior mapping data may or may not be correct as to what parts of the source code each test case of a plurality of test cases test. Processing logic may need to update the mapping data of one or more test cases when the source code changes. In another example, a test case may be modified by a user. The original mapping data may not be accurate for the modified test case, and processing logic may update the mapping data for the modified test case. Processing logic may execute the test case, in the background of system 100 and without indicating the user, in order to determine and generate the new mapping data. Processing logic may detect a modification of the test case or software application by receiving an indication at user interface module 240 that a modification has occurred. The indication includes a user saving a test case. Test case interface may also compare the original test case and software project saved at test case data store 110 to the test case or software application currently being saved or loaded on user device 104.

Method 300 continues to block 308 where processing logic receives a new test case to test software application. A new test case may be entered by user at user device 140. A test case may be in a form of a file or any other conventional form. A new test case may be stored in test case data store 110 and associated with one or more software applications. Method 300 continues to block 310 where processing logic generates mapping data for the new test case. The new mapping data may be similar to the mapping data generated in block 310. The mapping data may be stored in test case date store 110. In another example, mapping data may be stored on the user device 104. Mapping data may be stored using conventional data base techniques. Details of mapping data are described in regards to FIGS. 1 and 2.

Figure 4:
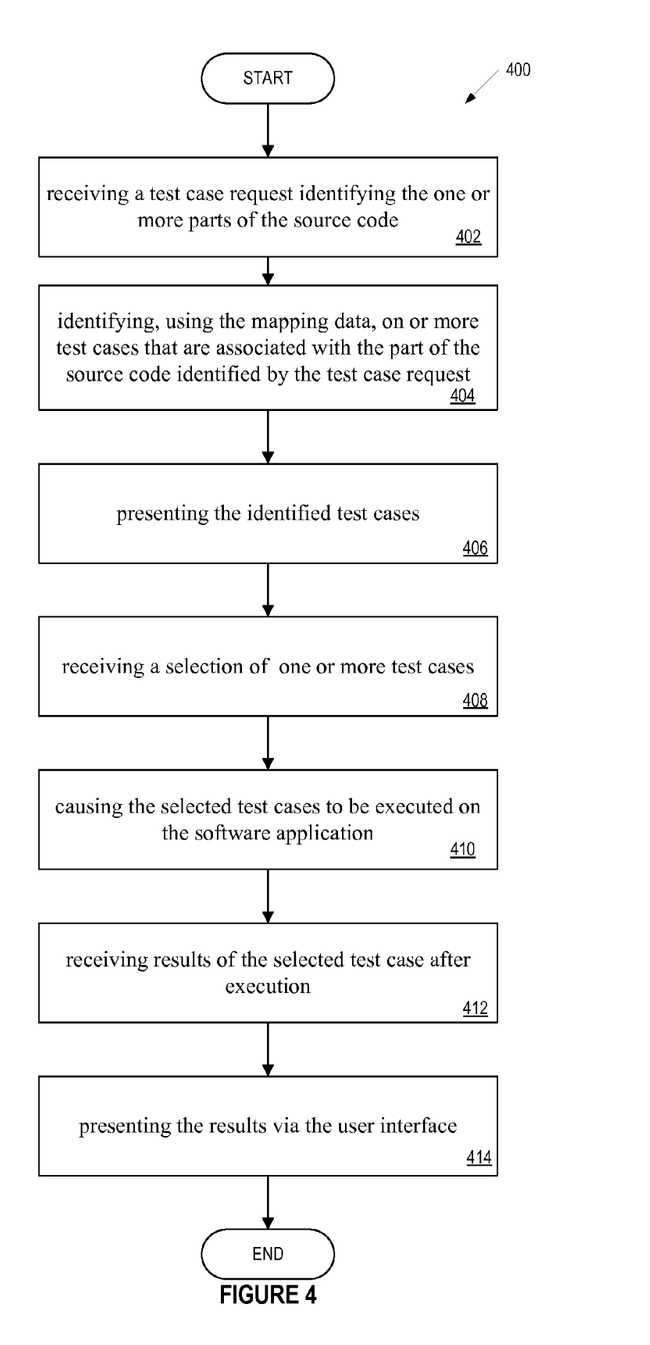
FIG. 4 is a flow diagram illustrating an example method for identifying test cases, according to an implementation of the disclosure.

FIG. 4 is a flow diagram illustrating an example method for identifying test cases, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by system 100 of FIG. 1. In another implementation, method 400 is performed by test case interface 130 of FIG. 2.

Method 400 begins at block 402 where the processing logic implementing the method receives a test case request identifying the one or more parts of source code. For example, a user may be presented a GUI, by test case interface 130, in user device 104 of FIG. 1. The user may enter the part of the code, for example the routine that requires testing. The user may enter the path or file name where the part of the code to be tested is located. For example, if the routine is "foo", the user may enter the file path arch/x86/kernel/time.c, where the file "time," contains the function, "foo."

Method 400 continues to block 404 where processing logic may take the test case request and identifies one or more test cases of the plurality of test cases that are associated with the part of the source code identified by the user by the test case request. For example, after the test case request is received from user device 104, test case interface 130 may communicate with the test case computer system 108 to locate all the test cases are associated with the source code described in the request, e.g., the routine, "foo," Test case computer system 108 may search the mapping data in test case data store 110 in order to determine the test cases that cover the routine, "foo." Test case computer system 108 may find zero to multiple test cases that cover the code, e.g., "foo," that is identified by the user.

Method 400 continues to block 406 where processing logic presents, via user interface, the identified test cases. For example, a GUI on user device presents to the developer all the test cases that test the routine, "foo." The GUI may also present the type of code coverage each test case provides. The GUI may present the user with the ability to select one or more of the test cases, so that the test cases may be run. In another example, if processing logic finds that no test cases cover the part of the code identified by the user, processing logic may send a notification to the user that no test cases have been found.

Method 400 continues to block 408 where processing logic receives a selection of the one or more test cases. For example, after the user is presented in a GUI the test cases that are associated with the routine, "foo," the user may select one or more test cases from the GUI. The user may then submit the request through the GUI, where the request is to run the selected test case.

Method 400 continues to block 410 where processing causes the selected test cases to be executed on the software application. For example, after test case interface 130 receives the request, test case interface 130 may locate the selected test cases and instruct the appropriate hardware to run the test cases. In one example, the test cases are run on test case computer system 108. In another example, the test cases may be run locally on the user device 104. Processing logic may also identify the appropriate software application for which the test cases are to be run. One or more test cases or test suites may be executed.

In method 400 at block 412, processing logic receives the results of the selected test case after the test cases are executed. The results of the test case may indicate the proportion of code coverage for the various code coverage types selected by the user. The results may indicate which lines, routines, etc. of the source code were tested by the executed test cases. The test results may indicate how the source code performed against the expected results for each test case.

In method 400 at block 414, processing logic presents the results via the user interface. For example, processing logic may send the results to be displayed in a GUI on user device 104. The results, as stated above in block 412, are indicative of the test results for the executed test cases for the selected software project.

Figure 5:
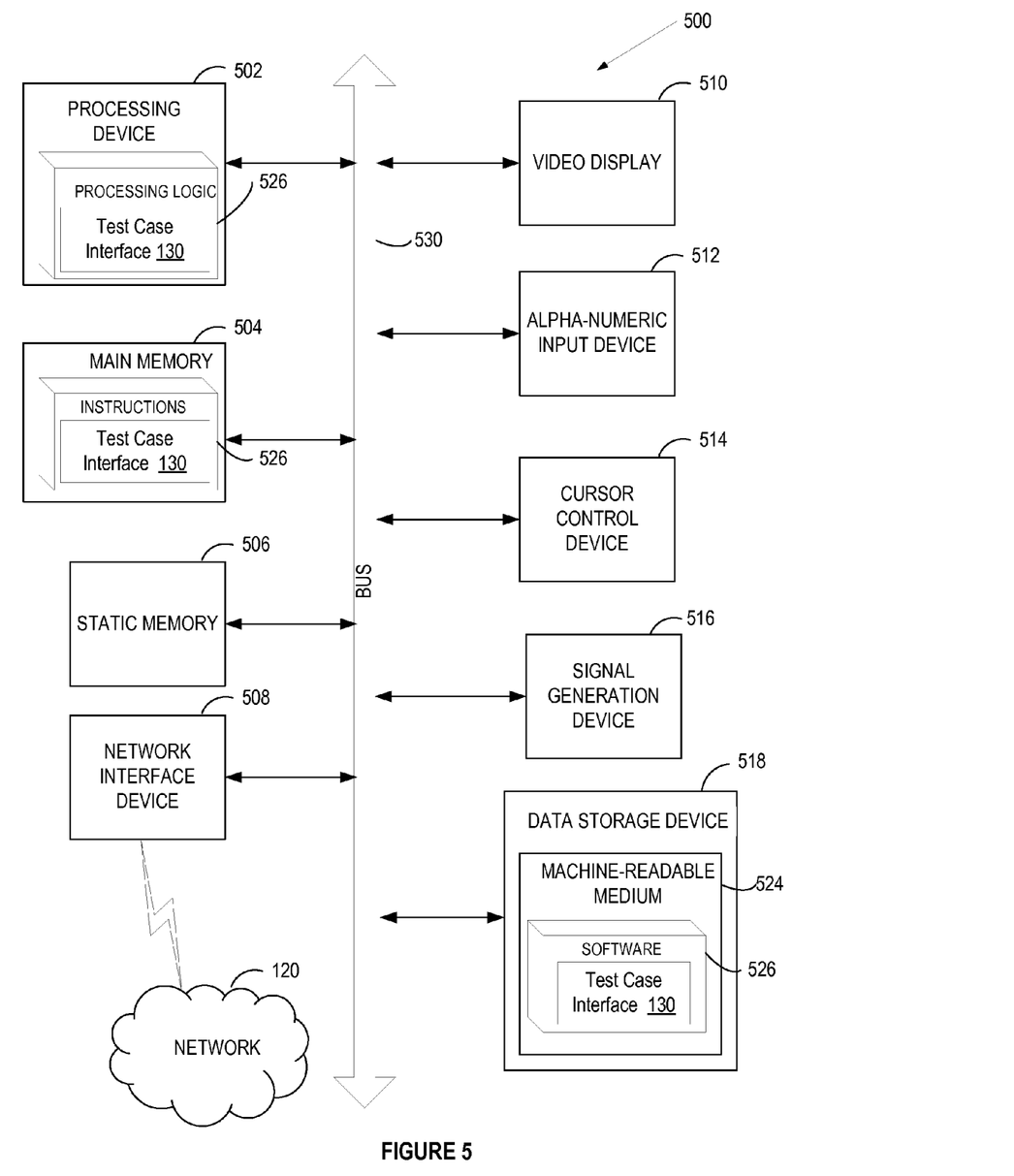
FIG. 5 illustrates a block diagram of one implementation of a computer system.

FIG. 5 illustrates a block diagram of one implementation of a computer system. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 120. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement the test case interface 130 to implement any one or more of the methodologies of functions described herein in a computer system, such as the system described with respect to FIG. 1, and/or a software library containing methods that call the above applications.

While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "initiating", "generating", "determining", "sending", "invoking", "storing", "updating", "identifying", "presenting", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
   receiving, by a processing device, a test case of a plurality of test cases to test a software application, wherein the test case comprises a test input for processing by the software application, the test input designed for verifying compliance with a specific requirement;
   responsive to receiving the test case, generating, by the processing device, mapping data in view of the test case that identifies a routine or a line of source code of the software application that the test case covers and maps the test case to the routine or the line of source code;
   receiving, from a user interface by the processing device, a test case request that identifies a particular routine or a particular line of source code; and
   responsive to receiving the test case request, identifying, by the processing device, one or more test cases of the plurality of test cases that test the particular routine or the particular line of source code using the mapping data that maps the one or more test cases to the particular routine or the particular line of source code.

2. The method of claim 1, further comprising:
   providing identifiers of the identified one or more test cases for presentation via the user interface.

3. The method of claim 2, further comprising:
receiving, via the user interface, a selection of the one or more test cases;
causing the selection to be executed for the software application;
receiving results of the selection after execution; and
presenting the results via the user interface.

4. The method of claim 2, further comprising:
determining, using the mapping data, that none of the plurality of test cases is associated with the particular routine or the particular line of source code identified in the test case request; and
presenting, via the user interface, an indication that none of the plurality of test cases is associated with the particular routine or the particular line of source code.

5. The method of claim 2 wherein presenting the test cases via the user interface comprises indicating a type of code coverage for each of the test cases.

6. The method of claim 1, further comprising:
updating the mapping data in response to detecting a modification to at least one of the test case or the software application.

7. The method of claim 1, further comprising:
receiving a new test case to test the software application; and
generating mapping data for the new test case, wherein the mapping data associates one or more parts of the source code to the new test case.

8. The method of claim 1, wherein generating mapping data for the test case comprises generating mapping data for associating at least one of the line of the source code with the test case or associating the routine of the source code with the test case.

9. The method of claim 1, wherein the mapping data for the test case comprises an indication of at least one of a function coverage, a statement coverage, a branch coverage, a condition coverage, a multiple condition coverage, or a parameter value coverage.

10. The method of claim 1, wherein generating mapping data comprises executing the test case.

11. A system comprising:
a memory to store instructions; and
a processing device, operatively coupled with the memory, to execute the instructions, the processing device to:
receive a test case of a plurality of test cases to test a software application, wherein the test case comprises a test input for processing by the software application, the test input designed for verifying compliance with a specific requirement;
responsive to receiving the test case, generate mapping data in view of the test case that identifies a routine or a line of source code of the software application that the test case covers and maps the test case to the routine or the line of source code;
receive, from a user interface, a test case request that identifies a particular routine or a particular line of source code; and
responsive to receiving the test case request, identify one or more test cases of the plurality of test cases that test the particular routine or the particular line of source code using the mapping data that maps the one or more test cases to the particular routine or the particular line of source code.

12. The system of claim 11, the processing device further to:
provide identifiers of the identified one or more test cases for presentation via the user interface.

13. The system of claim 11, the processing device further to:
receive, via the user interface, a selection of the one or more test cases;
cause the selection to be executed for the software application;
receive results of the selection after execution; and
present the results via the user interface.

14. The system of claim 11, the processing device further to:
determine, using the mapping data, that none of the plurality of test cases is associated with the particular routine or the particular line of source code identified in the test case request; and
present, via the user interface, an indication that none of the plurality of test cases is associated with the particular routine or the particular line of source code.

15. The system of claim 11, the processing device further to:
update the mapping data in response to detecting a modification to at least one of the test case or the software application.

16. A non-transitory computer readable storage medium including instructions that, responsive to execution by a processing device, cause the processing device to:
receive, by the processing device, a test case of a plurality of test cases to test a software application, wherein the test case comprises a test input for processing by the software application, the test input designed for verifying compliance with a specific requirement;
responsive to receiving the test case, generate, by the processing device, map data in view of the test case that identifies a routine or a line of source code of the software application that the test case covers and maps the test case to the routine or the line of source code;
receive, from a user interface by the processing device, a test case request that identifies a particular routine or a particular line of source code; and
responsive to receiving the test case request, identify, by the processing device, one or more test cases of the plurality of test cases that test the particular routine or the particular line of source code in view of the mapping data that maps the one or more test cases to the particular routine or the particular line of source code.

17. The non-transitory computer readable storage medium of claim 16, the processing device further to:
provide identifiers of the identified one or more test cases for presentation via the user interface.

18. The non-transitory computer readable storage medium of claim 17, the processing device further to:
receive, via the user interface, a selection of the one or more test cases;
cause the selection to be executed for the software application;
receive results of the selection after execution; and
present the results via the user interface.

19. The non-transitory computer readable storage medium of claim 16, the processing device further to:
update the mapping data in response to detecting a modification to at least one of the test case or the software application.

20. The non-transitory computer readable storage medium of claim 16, the processing device further to:
  receive a new test case to test the software application; and
  generate mapping data for the new test case, wherein the mapping data associates one or more parts of the source code to the new test case.

\* \* \* \* \*